(12) United States Patent
Davis

(10) Patent No.: US 11,928,950 B2
(45) Date of Patent: Mar. 12, 2024

(54) PERSONAL PROTECTION EQUIPMENT NETWORK (PPE-N)

(71) Applicant: Attache Holdings LLC, Montgomery, TX (US)

(72) Inventor: Alan Wesley Davis, Houston, TX (US)

(73) Assignee: ATTACHE HOLDINGS LLC, Montgomery, TX (US)

( * ) Notice: Subject to any disclaimer, the term of this patent is extended or adjusted under 35 U.S.C. 154(b) by 0 days.

(21) Appl. No.: 18/350,232

(22) Filed: Jul. 11, 2023

(65) Prior Publication Data
US 2023/0351879 A1      Nov. 2, 2023

Related U.S. Application Data

(63) Continuation-in-part of application No. PCT/US2022/015691, filed on Feb. 8, 2022.

(60) Provisional application No. 63/147,875, filed on Feb. 10, 2021.

(51) Int. Cl.
| | | |
|---|---|---|
| *G08B 23/00* | (2006.01) | |
| *G06K 7/10* | (2006.01) | |
| *G08B 21/18* | (2006.01) | |
| *H04W 4/021* | (2018.01) | |

(52) U.S. Cl.
CPC ......... *G08B 21/18* (2013.01); *G06K 7/10396* (2013.01); *G08B 23/00* (2013.01); *H04W 4/021* (2013.01)

(58) Field of Classification Search
None
See application file for complete search history.

(56) References Cited

U.S. PATENT DOCUMENTS

| | | | |
|---|---|---|---|
| 2010/0045464 A1* | 2/2010 | Knopf | F16P 3/147 |
| | | | 340/5.1 |
| 2018/0108236 A1* | 4/2018 | Kanukurthy | G06Q 10/0639 |
| 2019/0313710 A1* | 10/2019 | Insley | A41D 13/00 |
| 2021/0216773 A1* | 7/2021 | Bohannon | G06V 20/20 |
| 2021/0346554 A1* | 11/2021 | Behzadi | A61L 9/046 |
| 2021/0346555 A1* | 11/2021 | Behzadi | A61L 9/16 |
| 2023/0290242 A1* | 9/2023 | Kanukurthy | G08B 25/10 |

FOREIGN PATENT DOCUMENTS

| | | | | |
|---|---|---|---|---|
| CA | 3040135 A1 | * | 4/2018 | A41D 13/00 |
| WO | WO-2016089708 A1 | * | 6/2016 | G06F 19/00 |
| WO | WO-2017011911 A1 | * | 1/2017 | F16P 3/147 |

\* cited by examiner

*Primary Examiner* — Muhammad Adnan

(57) ABSTRACT

The present invention provides a PPE-N system that comprises PPE components, smart tags, smart tag readers configured to detect within working ranges and trigger audio-visual alarms and send a warning to a predetermined person, and a hub that compares signals from the smart tags to help assess the PPE-N component health. The present invention further comprises waypoints to verify that the PIPE component conforms to requirements of the PPE component and determine whether the PPE component is permitted in a predetermined area.

27 Claims, 8 Drawing Sheets

PERSONAL PROTECTION EQUIPMENT NETWORK (PPE-N)

FIELD OF THE INVENTION

The present invention generally relates to personal protection equipment. More specifically, the present invention relates to a network system that is designed to help workers stay safe.

BACKGROUND OF THE INVENTION

A network system that is designed to help workers stay safe is in demand. In many industries, maintaining workers' safety and health is critical because many workplace environments include various risks to employees.

In a work environment, industrial equipment can pose a serious threat to worker safety. Many workers rely on personal protective equipment (PPE) to ensure their safety, and employers strive to provide PPE and other safety equipment to increase protection, lower the risk of workplace injuries, and preclude the associated costs.

Companies have also adopted various rules and regulations to maintain worker safety and health. Some individuals may be required to wear or otherwise use PPE when entering or remaining in work environments. For example, workers in the nuclear industry may be required to wear radiation-protective clothing. Workers in mines, oil refineries, smelting facilities, or industrial painting operations may be required to wear respiratory protective equipment (RPE). However, compiling records pertaining to regulatory compliance is currently performed manually or semi-automatically and is relatively time-consuming. In addition, adherence to predetermined rules and regulations may become an issue in work environments, while any noncompliance may cause unsafe working environments. Thus, there is a need to develop a system to solve the problems.

The present invention is intended to address problems associated with and/or otherwise improve on conventional devices through an innovative network system designed to provide a convenient, effective means to ensure workers' safety while incorporating other problem-solving features.

SUMMARY

In accordance with the present invention, a PPE-N system is provided. The PPE-N system comprises a registration step and an operation step.

The registration step may include a user registration process through which to retrieve user information from users. The operation step may include smart tag readers, smart tags attached to PPE-N components and a hub.

The hub can be a software module for authorizations regarding using or maintaining the PPE-N components (e.g., hard hats, safety vests, safety boots, and gloves).

In one embodiment, the hub may be configured to authorize the use of PPE-N components based on a predetermined time and quality of the PPE-N components.

In other embodiment, the hub may be configured to compare signals from the smart tags to help assess the PPE-N component's health.

In preferred embodiments, the present invention can determine if the smart tag and the PPE-N component are missing and not being worn or out of the predetermined area.

In some other embodiments, the present invention can use RFID technology to network PPE-N components, allowing individual PPE-N components to communicate with each other from very short distances.

DETAIL DESCRIPTIONS OF THE INVENTION

All illustrations of the drawings are for the purpose of describing selected versions of the present invention and are not intended to limit the scope of the present invention.

Figure 8:
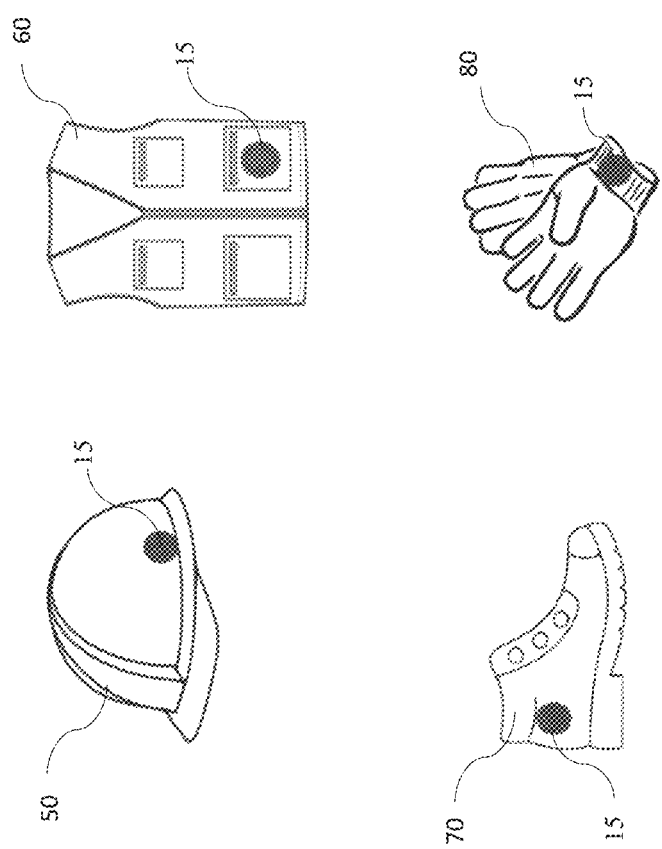
FIG. 8 is an illustration showing various PPE-N components of the present invention.

The present invention (Personal Protection Equipment-Network (PPE-N)) 100 provides a system designed to help workers stay safe. The present invention provides a hub 21 that stays in constant communication with PPE components 30 such as hard hats 50, safety vests 60, safety boots 70, and gloves 80 as shown in FIG. 8, ensuring that workers are using functional, approved equipment.

When entering a work zone, the way-points 23 provided in the present invention makes sure workers have the required PPE-N component 30 for that work area and determines whether the workers are authorized to work in the work zone they are entering, ensuring that workers are protected and allowed to enter only the access areas they are approved to work in.

Figure 1:
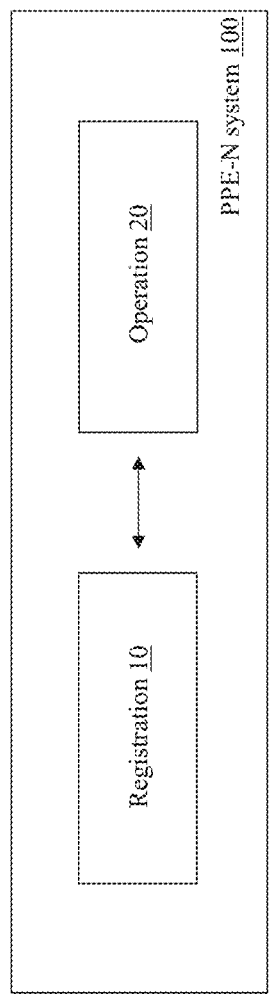
FIG. 1 is an illustration of one embodiment of the present invention.

As shown in FIG. 1, the present invention provides a PPE-N system 100 that comprises a plurality of processors and a plurality of memories, the latter containing instructions that, when executed by a processor, trigger a registration step 10 and an operation step 20. The instructions may include routines, programs, objects, data structures, and the like.

The PPE-N system 100 can be implemented in a network environment, which may comprise one or more servers or one or more data stores. In some embodiments, the PPE-N system 100 of the present invention can be loaded onto a user's computing device, which may be communicatively connected to a network.

In other embodiments, the PPE-N system 100 may be deployed on a computing device such that the PPE-N system 100 is configured as a cloud system.

In some other embodiments, the PPE-N system 100 can use Windows Internet Name Service to function as private networks or as sub-domains to larger networks.

Registration Step 10

The registration step 10 may include a user registration process through which to retrieve user information from users, who can be employers or employees.

The user registration process may provide a questionnaire, including via a web form, through which users can supply the various data necessary to identify the users.

In one embodiment, the user information may include name, business name, date and time of registration, passwords, and the like.

The user registration process may create a user profile 11 using the user information and save the user profile 11 in a storage device that may be included in the PPE-N system 100 of the present invention or that may be communicatively connected to the PPE-N system 100.

In some embodiments, the registration step 10 may include a modification/update process 12 that allows users to modify and update their profiles (user profile 11).

In some embodiments, the registration step 10 may include a tag registration process 13 through which to assign a unique PPE-N component 30 name for each piece of personal protection equipment (PPE) that can be used in the working environment.

The name of the PPE-N component 30 can be a combination of numbers and username and the name of the PPE (for example, 123456789-JOHN-SMITH-VEST).

The name of the PPE-N component 30 can be transferred to a smart tag 15, which can be any suitable smart tag known in the art. In one exemplary embodiment, the smart tag 15 can be directly attached to the PPE component 30.

The PPE component 30 can include clothing and protective wearable equipment for a single human, such as a hard hat 50, safety boots 70, gloves 80, and safety vest 60, as shown in FIG. 8.

Figure 4:
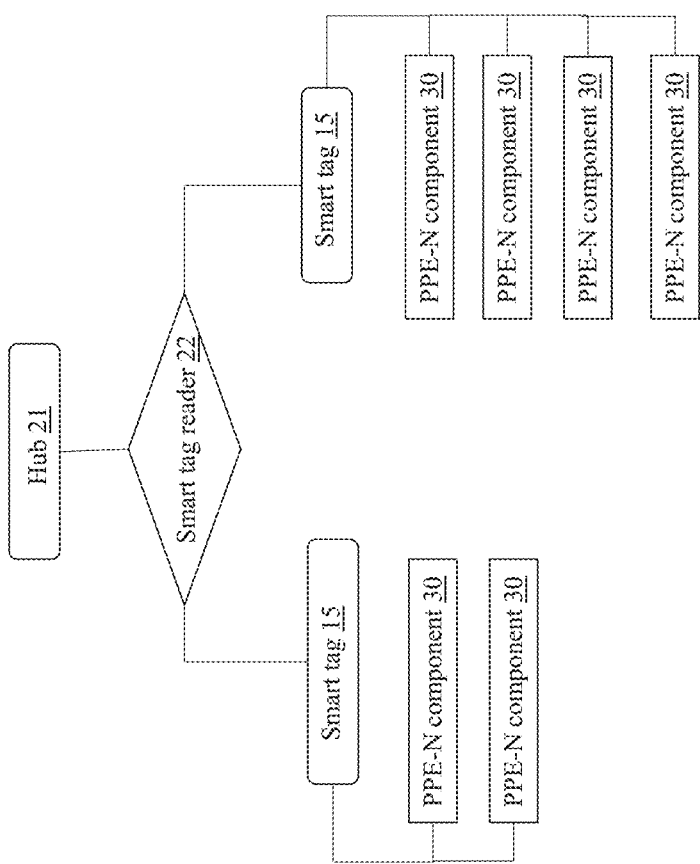
FIG. 4 is an illustration of one embodiment of the communication between the smart tags and readers of the present invention.
Figure 5:
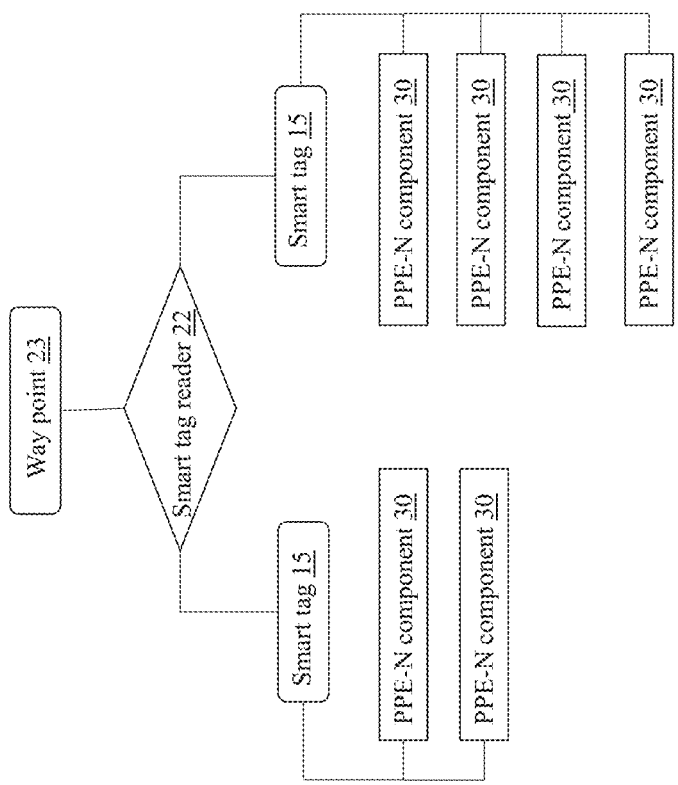
FIG. 5 is an illustration of one embodiment of the communication between the smart tag readers and the way point of the present invention.
Figure 6:
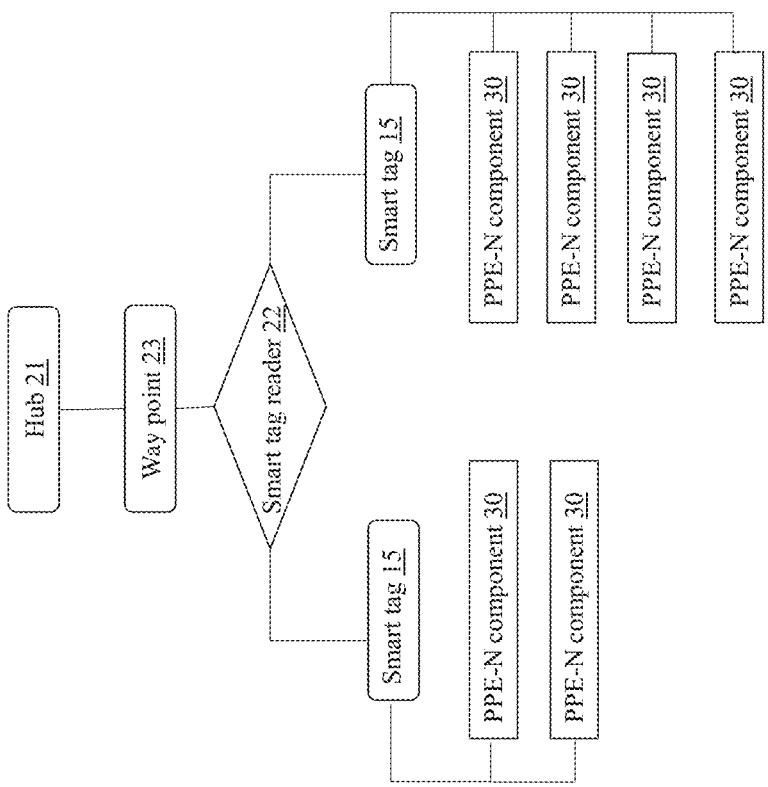
FIG. 6 is an illustration of one embodiment of the communication between the hub and the way point of the present invention.

In the present invention, PPE-N component 30 pieces can be networked together with smart tags 15 and smart tag readers 22 in various embodiments, as shown in FIGS. 4 to 6.

The smart tag 15 can be a data carrier that carries data accessible by suitable methods, such as wireless technology, where the data may include tag identification information, such as an identification number (e.g., serial number), username, and the name of the equipment. In some embodiments, the data may include any other information that a user needs.

The smart tags 15 may be RFID smart tags 15 that are programmable or rewritable and carry their own internal power source, such as a micro-battery, a thin film battery, or the like. The smart tags 15 may exchange their data information with data acquiring and/or transmitting devices, including, without limitation, readers and/or writers, scanners, and/or data receivers, such as wireless receivers.

The RFID smart tags 15 can be programmed for whatever piece of PPE component 30 they are attached to. For example, the RFID smart tags 15 can be identified as hard-hat-1234567, where the PPE-N component 30 is identified as a hard hat 50, and the unique hard hat identifier is 1234567. In some embodiments, the smart tags 15 can be passive and do not require power to operate.

In some embodiments, the PPE-N system 100 may include a battery-powered RFID reader that can be programmed to read more than fifty smart tags 15 per second.

Operation Step 20

The operation step 20 may include a process to scan and monitor PPE components 30 by communicating with the smart tags 15 attached to the PPE components 30, as shown in FIG. 4 to FIG. 6.

The operation step may include smart tag readers 22 that can be communicatively connected to the smart tags 15 attached to the PPE components 30.

The data from a smart tag 15 may be acquired by the smart tag readers 22. A smart tag reader 22 may include a device such as an antenna for communicating with the smart tag 15. The smart tag reader 22 may be placed in a critical spot to communicate with smart tags 15.

In some embodiments, the smart tag readers 22 can be installed in a user's computing device.

In some embodiments, the operation step 20 may include a hub 21. In this case, the smart tag readers 22 may be linked to the hub 21, as shown in FIG. 4 which is remotely programmable through a network.

The hub 21 can be a software module that may include functionalities such as authorizations regarding using or maintaining the PPE components 30. For example, if the exposure time or quality of the PPE component 30 in the workplace exceeds a predetermined time/value(s); users with particular profiles should leave the environment or replace the PPE component 30.

In one embodiment, the hub 21 may be configured to authorize the use of PPE components 30 based on a predetermined time and quality of the PPE components 30 and compare signals from the smart tags 15 to help assess the PPE-N component's 30 health.

In some embodiments, the hub 21 can compare the signal of PPE-N components 30 when they were first joined to the PPE-N system 100 and the current signal level to help assess the PPE-N component's 30 health. When PPE-N component 30 and the smart tags 15 are worn, the hub's ability to read the smart tag 15 can be diminished. Thus, such health checks can ensure proper smart tag 15-to-smart tag reader 22 communication.

In preferred embodiments, the smart tag reader 22 is constantly scanning. Should the smart tag reader 22 not see a preprogrammed smart tag 15 for more than the allotted time, it will assume the smart tag 15 and the PPE-N component 30 are missing and not being worn or out of the predetermined area (i.e., within the area monitored by the present invention).

After determining there is a missing PPE-N component 30, the smart tag reader 22 can trigger audible and visual alarms (audio-visual), as well as send a warning to a person responsible for controlling the environment, such as a site controller.

In some embodiments, the smart tag reader 22 can be configured to generate an alarm sound when an object including the PPE-N component 30 without a smart tag 15 enters a predetermined area.

In some embodiments, the present invention can use RFID technology to network PPE-N components 30, allowing individual PPE-N components 30 to communicate with each other from very short distances.

Figure 3:
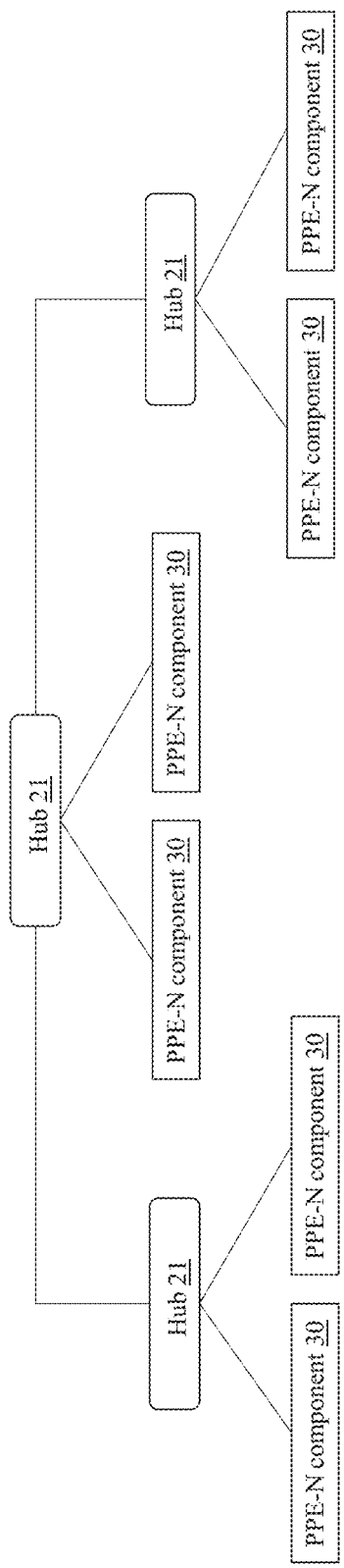
FIG. 3 is an illustration of one embodiment showing PPE-N components arranged in a star-bus topology with the hub of the present invention.

If PPE-N components 30 cannot communicate with other individual PPE-N components 30, it will assume they are out of range from each other and something is wrong. A practical example is a worker wearing a safety vest 60 and other PPE-N components 30 that are networked together where the worker removes the safety vest 60 and walks away. Once the worker removes the safety vest 60, the worker's other PPE-N component 30 would see that the safety vest 60 is no longer within working range (e.g., 3 ft) and would trigger an alarm. In one example, the PPE-N components 30 can be arranged in a star-bus topology with the hub 21, as shown in FIG. 3.

In some embodiments, the operation step 20 may include PPE-N sensors known in the art to notify workers when their equipment is failing or has failed. For example, when a PPE component 30 comprising clothing begins to wear and becomes faulty, the hub will see a change in the communications to the clothing and put the clothing in a maintenance mode.

Figure 2:
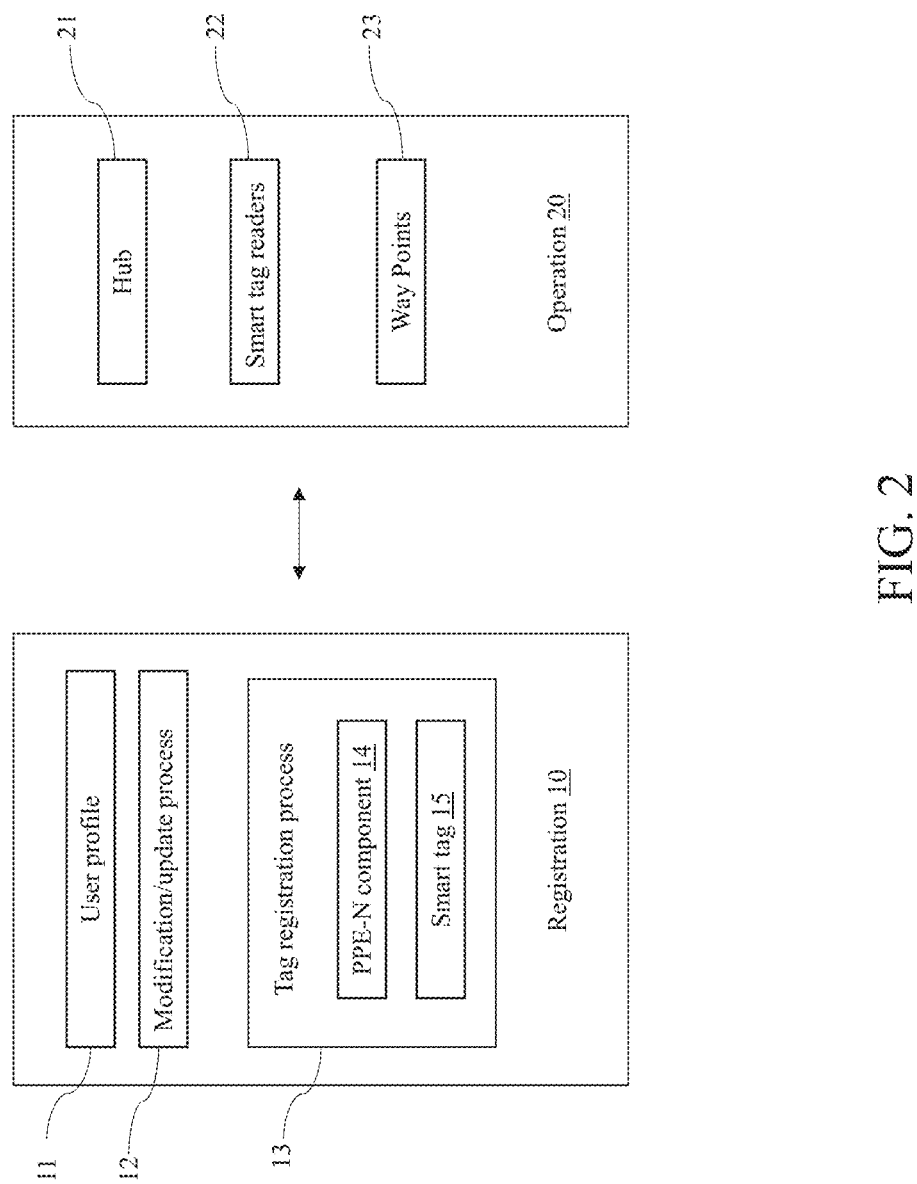
FIG. 2 is an illustration of one embodiment showing the registration and operation step of the present invention.

In some embodiments, the operation step 20 may include one or more stationary readers (also known as Way Points 23 as shown in FIG. 2). In this case, the hub 21 of the PPE-N system 100 can communicate with an area-wide Wi-Fi system and with the stationary readers 23 as shown in FIG. 4. When communicating with stationary readers (way point 23), the PPE-N system 100 (via the hub 21) can verify that the person wearing the PPE component 30 has the required equipment present and that the person also has permission to enter the area where the way point 23 is located.

Figure 7:
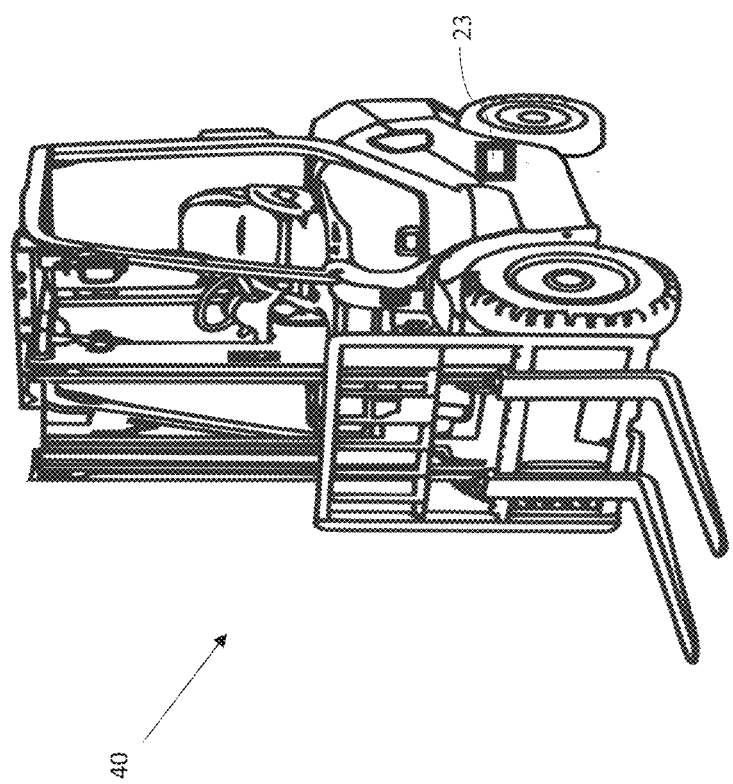
FIG. 7 is an illustration of one embodiment of the present invention with the way point attached to a forklift.

Such way points 23 can be mobile, capable of communicating in the same manner as stationary way points 23. As an example, a mobile way point 23 can be attached to a forklift 40, as shown in FIG. 7. The mobile way point 23 can verify whether the user has the necessary PPE-N component 30, training, and permission to operate around or on it. Mobile way points 23 can attach to objects, such as a forklift 40, using a magnet or a clamp mount.

The steps and the processes described in connection with the embodiments disclosed herein can be embodied directly in hardware, in a software module executed by a processor, or in a combination of the two. A software module can reside in a memory unit that can include volatile memory, non-volatile memory, and network devices, or other data storage devices now known or later developed for storing information/data. The volatile memory may be any type of volatile memory including, but not limited to, static or dynamic, random access memory (SRAM or DRAM). The non-volatile memory may be any non-volatile memory including, but not limited to, ROM, EPROM, EEPROM, flash memory, and magnetically or optically readable memory or memory devices such as compact discs (CDs) or digital video discs (DVDs), magnetic tape, and hard drives.

The computing device may be a laptop computer, a cellular phone, a personal digital assistant (PDA), a tablet computer, and other mobile devices of the type. Communications between components and/or devices in the systems and methods disclosed herein may be unidirectional or bidirectional electronic communication through a wired or wireless configuration or network. For example, one component or device may be wired or networked wirelessly directly or indirectly, through a third party intermediary, over the Internet, or otherwise with another component or device to enable communication between the components or devices. Examples of wireless communications include, but are not limited to, radio frequency (RF), infrared, Bluetooth, wireless local area network (WLAN) (such as WiFi), or wireless network radio, such as a radio capable of communication with a wireless communication network such as a Long Term Evolution (LTE) network, WiMAX network, 3G network, 4G network, and other communication networks of the type. In example embodiments, network can be configured to provide and employ 5G wireless networking features and functionalities.

Although the invention has been explained in relation to its preferred embodiment, it is to be understood that many other possible modifications and variations can be made without departing from the spirit and scope of the invention.

What is claimed is:

1. A Personal Protection Equipment Network (PPE-N) system comprising:
   one or more PPE components;
   a plurality of smart tags attached to the one or more PPE components;
   a plurality of smart tag readers communicatively connected to the plurality of smart tags, wherein the plurality of smart tag readers are configured to constantly scan the plurality of smart tags and, when the plurality of smart tag readers cannot detect the plurality of smart tags for more than an allotted time, the plurality of smart tag readers are configured to trigger audio-visual alarms and send a warning to a predetermined person;
   a hub communicatively linked to the smart tag readers, the hub is remotely programmable through a network and configured to:
      authorize use of the one or more PPE components based on a predetermined exposure time and quality of the one or more PPE components;
      compare signals, to authorize use of a smart tag of the plurality of smart tags, when the smart tag first joined the PPE-N with current signals to assess the one or more PPE components' health;
      generate an alarm sound when an object without a required smart tag enters a predetermined area;
   a plurality of waypoints communicatively connected to the hub, wherein the waypoints are configured to:
      verify, by communication with the plurality of smart tags, that the one or more PPE components attached to the plurality of smart tags conform to requirements of the one or more PPE components;
   detect the plurality of smart tags attached to the one or more PPE components; and
   determine whether the one or more PPE components are permitted in the predetermined area.

2. The PPE-N system as claimed in claim 1, wherein the one or more PPE components are hard hats.

3. The PPE-N system as claimed in claim 1, wherein the one or more PPE components are pairs of gloves.

4. The PPE-N system as claimed in claim 1, wherein the one or more PPE components are safety vests.

5. The PPE-N system as claimed in claim 1, wherein the one or more PPE components are pairs of safety boots.

6. The PPE-N system as claimed in claim 1, wherein the plurality of smart tags are Radio Frequency Identification Device (RFID) smart tags.

7. The PPE-N system as claimed in claim 1, wherein one or more waypoints of the plurality of waypoints are mobile.

8. The PPE-N system as claimed in claim 1, wherein the one or more waypoints of the plurality of waypoints are stationary.

9. The PPE-N system as claimed in claim 1, wherein the PPE-N system further comprises
   a plurality of sensors configured to notify one or more predetermined people when the one or more PPE components fail to satisfy a predetermined condition based on analyzing signals from the sensors.

10. A Personal Protection Equipment Network (PPE-N) system comprising:
    one or more PPE components;
    a plurality of smart tags each having an antenna, attached to the one or more PPE components;
    a plurality of smart tag readers communicatively connected to the plurality of smart tags, wherein the plurality of smart tag readers are configured to constantly scan the plurality of smart tags and, when the plurality of smart tag readers cannot detect the plurality of smart tags for more than an allotted time, the plurality of smart tag readers are configured to trigger audio-visual alarms and send a warning to a predetermined person;

a hub communicatively linked to the smart tag readers, the hub is remotely programmable through a network and configured to:

authorize the use of one or more PPE components based on a predetermined time and quality of the one or more PPE components;

compare signals, to authorize use of a smart tag of the plurality of smart tags, when the smart tag first joined the PPE-N with current signals to assess the one or more PPE components' health;

generate an alarm sound when an object without a required smart tag enters a predetermined area;

a plurality of waypoints communicatively connected to the hub, wherein the waypoints are configured to:

verify, by communication with the plurality of smart tags, that the one or more PPE components attached to plurality of the smart tags conform to requirements of the one or more PPE components;

detect the plurality of smart tags attached to the one or more PPE components; and determine whether the one or more PPE components are permitted in the predetermined area.

11. The PPE-N system as claimed in claim 10, wherein the one or more PPE components are hard hats.

12. The PPE-N system as claimed in claim 10, wherein the one or more PPE components are pairs of gloves.

13. The PPE-N system as claimed in claim 10, wherein the one or more PPE components are a safety vests.

14. The PPE-N system as claimed in claim 10, wherein the one or more PPE components are pairs of safety boots.

15. The PPE-N system as claimed in claim 10, wherein the plurality of smart tags are Radio Frequency Identification Device (RFID) smart tags.

16. The PPE-N system as claimed in claim 10, wherein one or more waypoints of the plurality of waypoints are mobile.

17. The PPE-N system as claimed in claim 10, wherein one or more waypoints of the plurality of waypoints are stationary.

18. The PPE-N system as claimed in claim 10, wherein the PPE-N system further comprises a plurality of sensors configured to notify one or more predetermined people when the one or more PPE components fail to satisfy a predetermined condition based on analyzing signals from the sensors.

19. A Personal Protection Equipment Network (PPE-N) system comprising:

one or more PPE components;

a plurality of smart tags attached to the one or more PPE components and communicatively connected to a user's computing device;

a plurality of smart tag readers communicatively connected to the plurality of smart tags, wherein the plurality of smart tag readers are configured to constantly scan the plurality of smart tags and, when the plurality of smart tag readers cannot detect the plurality of smart tags for more than an allotted time, the plurality of smart tag readers are configured to trigger audio-visual alarms and send a warning to a predetermined person;

a hub communicatively linked to the plurality of smart tag readers, the hub is remotely programmable through a network and configured to:

authorize the use of one or more PPE components based on a predetermined time and quality of the one or more PPE components;

compare signals, to authorize use of a smart tag of the plurality of smart tags, when the smart tag first joined the PPE-N with current signals to assess the one or more PPE components' health;

generate an alarm sound when an object without a required smart tag enters a predetermined are;

a plurality of waypoints communicatively connected to the hub, wherein the waypoints are configured to:

verify, by communication with the plurality of smart tags, that the one or more PPE components attached to the plurality of smart tags conform to requirements of the PPE component;

detect the plurality of smart tags attached to the one or more PPE components; and determine whether the one or more PPE components is permitted in the predetermined area.

20. The PPE-N system as claimed in claim 19, wherein the one or more PPE components are hard hats.

21. The PPE-N system as claimed in claim 19, wherein the one or more PPE components are pairs of gloves.

22. The PPE-N system as claimed in claim 19, wherein the one or more PPE components are safety vests.

23. The PPE-N system as claimed in claim 19, wherein the one or more PPE components are pairs of safety boots.

24. The PPE-N system as claimed in claim 19, wherein the plurality of smart tags are Radio Frequency Identification Device (RFID) smart tags.

25. The PPE-N system as claimed in claim 19, wherein one or more waypoints of the plurality of waypoints are mobile.

26. The PPE-N system as claimed in claim 19, wherein one or more waypoints of the plurality of waypoints are stationary.

27. The PPE-N system as claimed in claim 19, wherein the PPE-N system further comprises a plurality of sensors configured to notify one or more predetermined people when the one or more PPE components fail to satisfy a predetermined condition based on analyzing signals from the sensors.

* * * * *